US010820266B2

(12) United States Patent
Bhartia et al.

(10) Patent No.: US 10,820,266 B2
(45) Date of Patent: Oct. 27, 2020

(54) METHOD AND DEVICE FOR DYNAMIC AND SEAMLESS LINK SELECTION

(71) Applicant: Cisco Technology, Inc., San Jose, CA (US)

(72) Inventors: Apurv Bhartia, San Mateo, CA (US); Simon Eric Miani Barber, San Francisco, CA (US); Feng Wang, Fremont, CA (US); Derrick Lyndon Pallas, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/120,088

(22) Filed: Aug. 31, 2018

(65) Prior Publication Data
US 2019/0320385 A1    Oct. 17, 2019

Related U.S. Application Data (60) Provisional application No. 62/657,553, filed on Apr. 13, 2018.

(51) Int. Cl.
*H04W 48/20* (2009.01)
*H04W 76/10* (2018.01)
(Continued)

(52) U.S. Cl.
CPC .......... *H04W 48/20* (2013.01); *H04W 24/08* (2013.01); *H04W 76/10* (2018.02); *H04B 17/318* (2015.01); *H04W 24/10* (2013.01)

(58) Field of Classification Search
CPC ..... H04W 48/20; H04W 24/08; H04W 76/10; H04W 24/10; H04B 17/318
See application file for complete search history.

(56) References Cited

U.S. PATENT DOCUMENTS 7,480,264 B1    1/2009  Duo et al.
7,940,731 B2    5/2011  Gao et al.
(Continued)

FOREIGN PATENT DOCUMENTS

EP    0589552 A2    3/1994

OTHER PUBLICATIONS

International Search Report and Written Opinion from the International Searching Authority, dated Jul. 8, 2019, 14 pages, for corresponding International Patent Application No. PCT/US2019/026555.

(Continued)

*Primary Examiner* — Dady Chery
(74) *Attorney, Agent, or Firm* — Polsinelli PC (57) ABSTRACT

A disclosed method is performed at an access point including a processor and non-transitory memory. The method includes receiving a request message from a client device, where the request message includes a request for an allocation of a wireless channel for the client device from the access point. The method further includes exchanging candidate and load information with a plurality of other access points. The method additionally includes selecting a preferred access point from the access point and the plurality of other access points based on the candidate and load information exchanged with the plurality of other access points. The method also includes facilitating the allocation of the wireless channel for the client device from the preferred access point.

20 Claims, 7 Drawing Sheets

(51) Int. Cl.
*H04W 24/08* (2009.01)
*H04B 17/318* (2015.01)
*H04W 24/10* (2009.01)

(56) References Cited

U.S. PATENT DOCUMENTS

| | | |
|---|---|---|
| 9,503,971 B2 | 11/2016 | Umetsu |
| 9,788,269 B2 | 10/2017 | Gokhale |
| 2005/0130658 A1 | 6/2005 | Stephens |
| 2012/0020215 A1* | 1/2012 | Lai .................... H04L 43/0817 370/235 |
| 2017/0181076 A1 | 6/2017 | Jeong et al. |
| 2017/0188271 A1 | 6/2017 | Van Oost et al. |

OTHER PUBLICATIONS

"Client Balancing", Cisco Meraki Documentation, pp. 1-6.

* cited by examiner

METHOD AND DEVICE FOR DYNAMIC AND SEAMLESS LINK SELECTION

PRIORITY CLAIM

This application claims priority to U.S. provisional patent application No. 62/657,553 filed on Apr. 13, 2018, the contents of which are hereby incorporated by reference.

TECHNICAL FIELD

The present disclosure relates generally to computer networking, and more specifically, to directing wireless access point and wireless link selection in a cloud-managed wireless LAN.

BACKGROUND

Conventional wireless LANs (WLANs) often contain on-premise controllers. A controller is a central entity that collects necessary information from access points and decides which access point would provide a wireless channel connecting a client device. An on-premise controller is typically located on the same wired LAN as the access points and receives client devices' probe requests and/or association requests forwarded by the access points. In addition to forwarding requests, each access point also reports load related statistics to a respective controller. These statistics can be simple number of currently associated client devices or complex metrics indicating how busy or utilized an access point is.

Different from conventional WLANs, due to latency consideration, cloud-managed WLAN architectures often do not let an on-premise controller make association decisions for access points. For example, when a client device sends an association request, sending information to a logical cloud controller on the Internet and waiting for its decision would incur unacceptable delay in association response time, thus degrading user experience. Without a view of the overall load of the wireless network, however, an access point chosen for a client may be suboptimal. For example, in existing cloud-managed WLAN architectures, wireless links often undergo temporal and spatial changes, e.g., client devices moving to different locations. To accommodate such changes, hand-offs between access points occur. Thus, in existing cloud-managed WLAN architecture, without the overall wireless network information, an access point chosen during the hand-offs may not provide optimal client experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Cloud-managed WLANs have gained attraction in enterprise market. For at least the reasons explained above, without on-premise controllers assisting the decision making, client device load balancing is particularly challenging in existing cloud-managed WLANs. In previously existing cloud-managed WLAN, while a client device attempts to be associated to the best access point (e.g., providing the strongest and/or most reliable signal) at all times, it is often not possible. At the time of initial association, a wireless client typically selects one access point out of (possibly) multiple access points based on pre-configured connection criteria. However, wireless links often change with time (e.g., due to interference, client roaming, etc.), thereby rendering the earlier decision based on static information obsolete. Further, a client device generally associates to the access point based on its own view of the network which may (or may not) be optimal for them individually, but not for the network collectively (e.g., in consideration of other client devices connected to the network). While a client device is capable of re-associating to other access points, such behavior is not only nondeterministic (e.g., depending on the individual client implementations), but also likely to result in another sub-optimal decision, given the client device's selfish motive in conjunction with its limited view of the network. The inability of dynamic load balancing in existing cloud-managed WLANs hinders achieving high performance (e.g., throughput) network configurations in enterprise wireless deployments.

Accordingly, described herein are methods and devices that perform client device load balancing in a distributed and timely manner. Embodiments described herein apply to cloud-managed WLANs that have multiple access points and multiple client devices, and each of the multiple client devices can be associated to multiple candidate access points for wireless connectivity. Embodiments described herein present a dynamic and seamless link selection mechanism that solves the aforementioned problems in existing cloud-managed WLANs. In accordance with some implementations, different access point-client links are probed and the best one is chosen under the current condition. In some implementations, the current condition can be impacted by factors such as access point load, wireless interference, achievable capacity, etc. In some implementations, once the access points and the associated access point-client links are probed, the access points exchange their connection scores and unequivocally determine a preferred access point (also referred to as a winner access point) with which the client device can associate. Thus, without relying on information from the client devices, neighboring access points can move the client devices between themselves and continuously measure metrics in order to select the best access point fitting one or more client connection criteria. In some implementations, the aforementioned process happens periodically in order to combat changing wireless conditions. This ensures that each client device is consistently connected to the respective best access point.

In some implementations, a dynamic and seamless link selection method is performed at an access point including a processor and non-transitory memory. The method includes receiving a request message from a client device, wherein the request message includes a request for an allocation of a wireless channel for the client device from the access point. The method also includes exchanging candidate and load information with a plurality of other access points. The method additional includes selecting a preferred access point from the access point and the plurality of other access points based on the candidate and load information exchanged with the plurality of other access points. The method further includes facilitating the allocation of the wireless channel for the client device from the preferred access point.

In some implementations, the candidate and load information is exchanged between the access point and the plurality of other access points through wired connections.

In some implementations, exchanging the candidate and load information with the plurality of other access points is performed in response to receiving the request message.

In some implementations, exchanging the candidate and load information with the plurality of other access points is performed periodically.

In some implementations, the method further includes updating a local candidates table and a local load table, stored in the non-transitory memory, based on the candidate and load information received from the plurality of other access points. In such implementations, the local candidates table can include candidate access points for each client device connectable to the access point and the plurality of other access points. In such implementations, an entry of the local candidates table can include a MAC address of a particular client device, a sub-table of candidate access points for the particular client device, a current preferred access point for the particular client device, and a timestamp of latest update of the entry. In such implementations, the local load table can include loads of the access point and the plurality of other access points. In such implementations, an entry of the local load table can include a LAN IP address of a respective access point, a current load of the respective access point, and a timestamp of latest update to the entry.

In some implementations, selecting the preferred access point from the access point and the plurality of other access points based on the candidate and load information exchanged with the plurality of other access points includes selecting the preferred access point with the lowest load among candidate access points based on the candidate and load information.

In some implementations, the request is a probe request including SSID of the client device and RSSI of the wireless channel. In such implementations, the candidate and load information exchanged with the plurality of other access points includes a candidacy message informing the plurality of other access points of its candidacy to host the client device.

In some implementations, the request for the allocation of the wireless channel includes an association request from the client device to establish the wireless channel. In such implementations, the candidate and load information exchanged with the plurality of other access points includes a load message to update the plurality of other access points of an increase in load of the access point. In such implementations, facilitating the allocation of the wireless channel for the client device from the preferred access point includes determining whether the access point is the preferred access point in response to receiving the association request, transmitting an association response with success status to the client device in accordance with a determination that the access point is the preferred access point, and transmitting an association response with deny status to the client device in accordance with a determination that the access point is not the preferred access point.

In some implementations, the method further includes detecting a disassociation of the client device from the access point. In such implementations, the candidate and load information exchanged with the plurality of other access points includes a load message to update the plurality of other access points of a decrease in load of the access point.

In such implementations, selecting the preferred access point from the access point and the plurality of other access points based on the candidate and load information includes periodically examining whether or not quality of the wireless channel has fallen below a predetermined threshold, and selecting the preferred access point from the plurality of other access points in accordance with a determination that the quality of the wireless channel has fallen below the predetermined threshold; and facilitating the allocation of the wireless channel for the client device from the preferred access point includes steering away the client device to the preferred access point.

Example Embodiments

Figure 1:
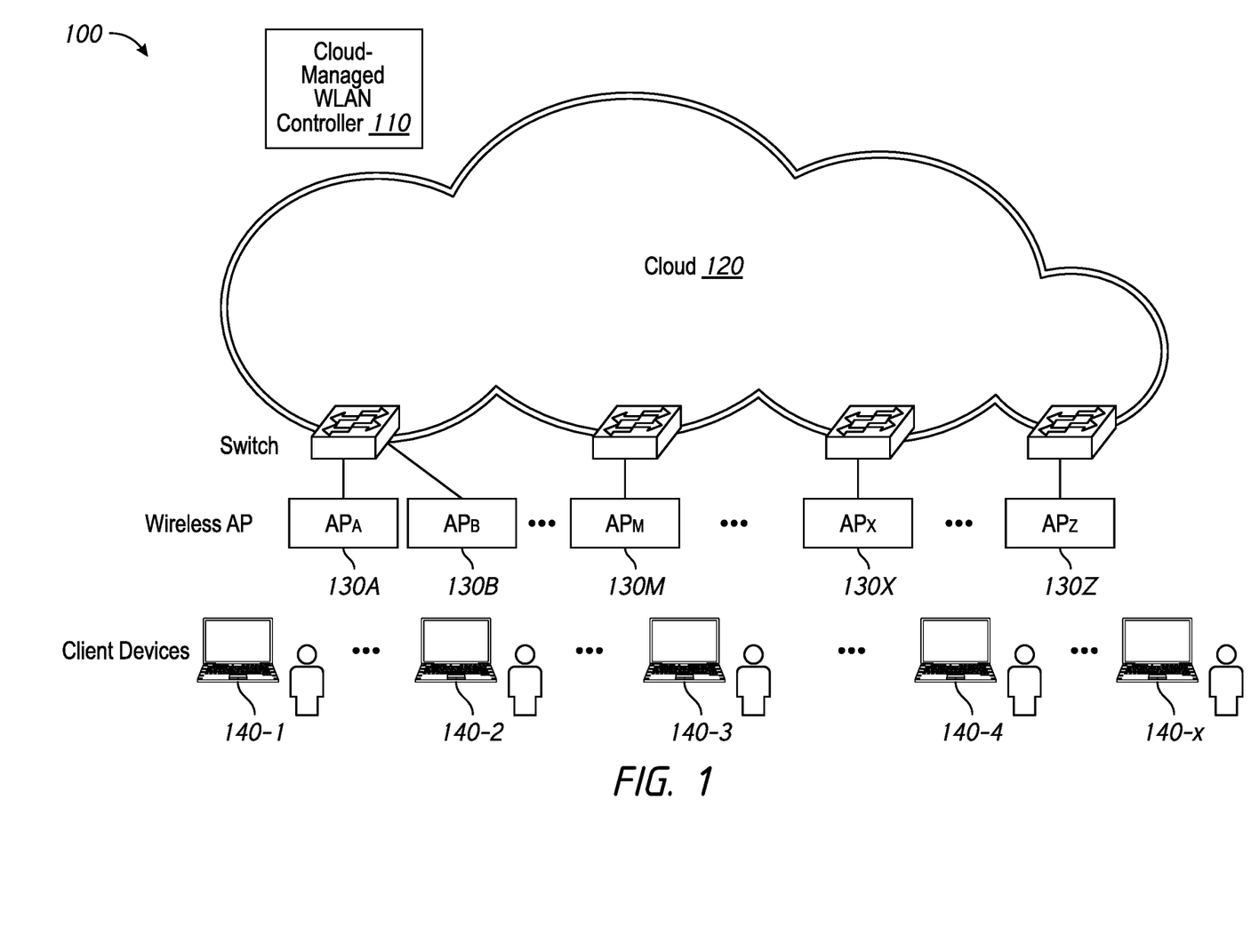
FIG. 1 is a schematic diagram of a network environment in accordance with some implementations.

FIG. 1 is a schematic diagram of a network environment 100 in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network environment 100 includes a plurality of client devices 140-1, 140-2, 140-3, 140-4 ... 140-*x*, hereinafter collectively referred to as the client devices 140. The client devices 140 are wirelessly connected to various network access points, e.g., access point A 130A, access point B 130B, access point M 130M, access point X 130X ... access point Z 130Z etc. In some implementations, the network environment 100 also includes a cloud-managed WLAN controller 110 coupled to a cloud 120.

The cloud 120 can be, for example, a wide access network (WAN) (e.g., the Internet), a cellular network, and/or an enterprise network. Additional network components can also be part of the network environment 100, such as firewalls, virus scanners, routers, switches, application servers, databases, as well as additional controllers, access points, access switches, stations, and the like. In some implementations, the network components in the network environment 100 are implemented as hardware, software, or a combination of both.

In some implementations, the cloud-managed WLAN controller 110 provides remote management of network services in the network 100. In some implementations, the cloud-managed WLAN controller 110 off-loads at least some real-time decision making that are sensitive to network latency. In some implementations, the off-loaded tasks are distributed among the wireless access points 130A, 130B, 130M, 130X, and/or 130Z etc. In such implementations, management decisions are made with network-wide considerations rather than allowing independent access point(s) to make decisions selfishly based only local consideration(s).

In some implementations, a client device 140 is, for example, a personal computer, a laptop computer, a tablet computer, a smart phone, a mobile computing device, a server, a cloud-based device, a virtual device, an Internet appliance, and/or the like. In some implementations, the client devices 140 are coupled to the access points 130 over wireless channels. In some implementations, the client devices 140 access a WLAN or a network that is part of the cloud 120 (e.g., including switches as shown in FIG. 1) using a radio frequency (RF) antenna and network software complying with IEEE 802.11x.

To provide network services to the client devices 140, in some implementations, the access points 130 comply with IEEE 802.11x protocols (promulgated by the Institute of Electrical and Electronics Engineers). As such, the access points provide Wi-Fi service to the client devices 140 over wireless communication channels. Under IEEE 802.11, a beacon with one or more basic service set identifiers (BSSIDs) is periodically sent in order to advertise a presence for new connections and to maintain current connections. The access points 130 then listen for packets addressed to the associated BSSIDs and ignore packets addressed to unassociated BSSIDs. Furthermore, the access points 130 forward packets addressed to MAC (Media Access Control) addresses of associated stations. In some implementations, each of the access points 130 is connected to a wired hub, switch, or router connected to the cloud 120. In some implementations, access point functionality can be incorporated into a switch or router. The access points 130 performing dynamic and seamless link selection in accordance with implementations described herein thus reduce real-time communication with the cloud-managed WLAN controller 110. As a result, the network 100 provides speedier hand-offs while the client devices 140 roam.

Figure 2:
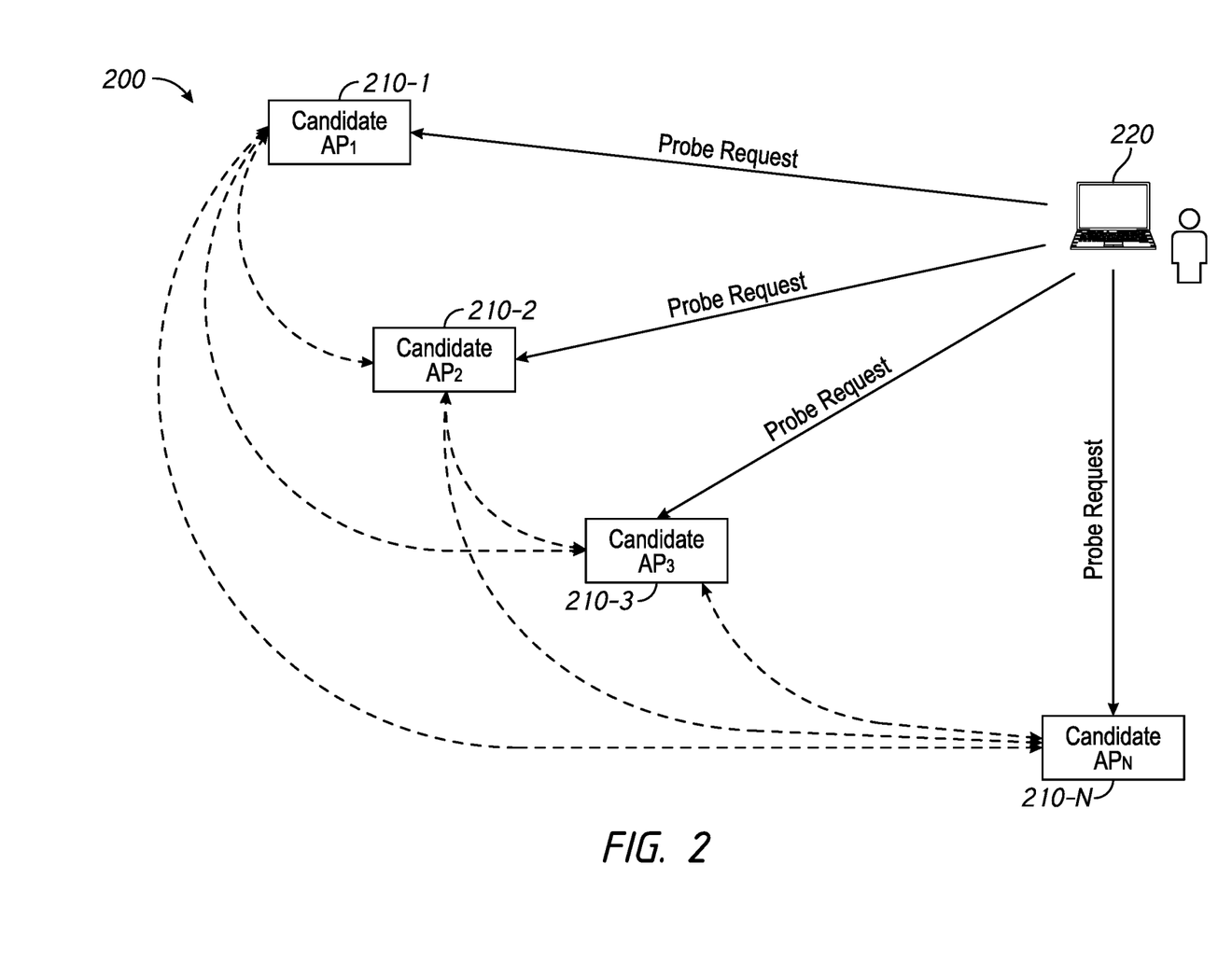
FIG. 2 is a schematic diagram of an example access point selection process in accordance with some implementations.

FIG. 2 is a schematic diagram 200 illustrating access point selection in response to probe requests in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, in some implementations, a client device 220 scans radio frequency spectra by broadcasting probe requests on a plurality of wireless channels to one or more candidate access points 210. For example, the client device 220 broadcasts probe requests to candidate access point 1 210-1, access point 2 210-2, access point 3 210-3 . . . access point N 210-N. The access points 210-1, 210-2, 210-3 . . . 210-N are candidates for providing wireless services to the client device 220.

In some implementations, the probe request received by each of the access points 210 includes a service set identifier (SSID) and a received signal strength indication (RSSI). In some implementations, as indicated by the dotted lines in FIG. 2, in response to receiving the probe requests, the access points 210 generate control messages encapsulating candidacy and load information and exchange the control messages in order to select a preferred access point (also known as a winner access point) from the access points 210 servicing the client device 220. The preferred access point selection is further described in detail below with reference to FIG. 4.

In some implementations, when a respective access point 210 receives a respective probe request, it determines whether the SSID in the respective request matches one of SSIDs that the respective access point 210 supports. In some implementations, the respective access point 210 also checks if the RSSI in the respective probe request from the client device 220 is above a certain threshold in order to ensure wireless connection quality. As will be described below, in some implementations, a sticky client, whose RSSI to its host access point has dropped below the threshold for good quality of wireless connection, is steered to another candidate access point capable of providing a better wireless connection.

In some implementations, for each client device 220, there are multiple candidate access points that can host it, some with higher load than others. For example, among candidate access points 210-1, 210-2, 210-3 . . . 210-N, candidate access point 1 210-1 may be servicing more client devices than access point 2 210-2 in the morning and servicing fewer client devices than access point 3 210-2 in the evening. As will be described below in detail, in some implementations, a preferred access point that has the lowest load is selected to provide the client device 220 wireless service.

Figure 3:
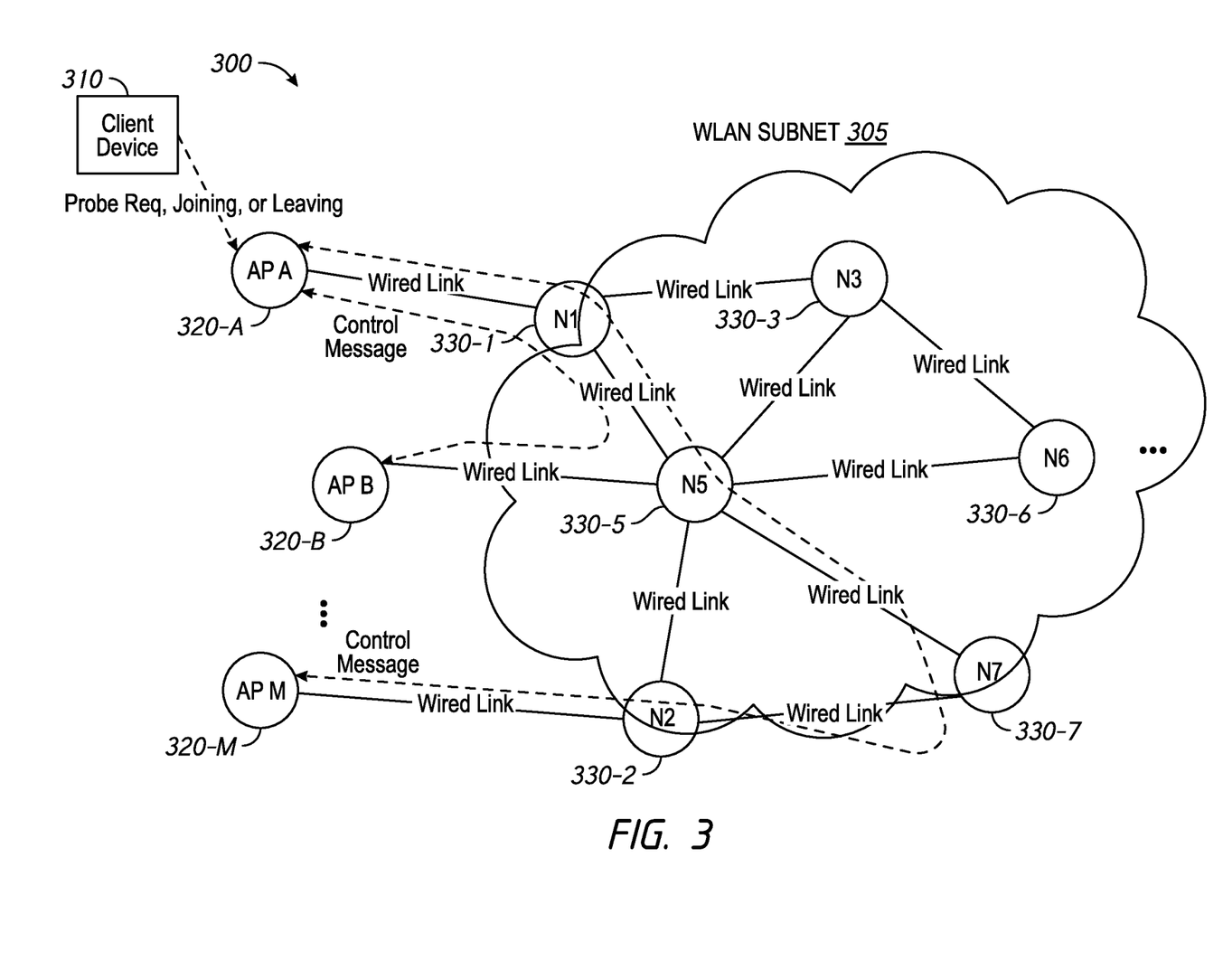
FIG. 3 is a schematic diagram of access points exchanging control messages in accordance with some implementations.

FIG. 3 is a schematic diagram 300 of access points exchanging control messages in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, in some implementations, access points exchange up-to-date candidacy (with respect to client devices) and load information with other access points within the same subnet by broadcasting control messages over wired LAN. Specifically, a) upon receiving a probe request from a client, an access point broadcasts a candidacy message over wired LAN to inform other access points about its candidacy to host this client; and b) upon a client joining or leaving a wireless network, the host access point broadcasts a load message over wired LAN to update other access points about its load.

For example, in FIG. 3, a client device 310 may wirelessly connect to access point A 320-A, send out probe requests to a plurality of access points 320 as described above with reference to FIG. 2, request to establish a wireless connection with access point A 320-A, or disconnect from access point A 320-A. In response to receiving the probe request from the client device 310, access point A 320-A broadcasts a candidacy message in order to inform other access points (e.g., access point B 320-B and access M 320-M) about its candidacy to host the client device 310. In response to the association request, access point A 320-A broadcasts a load message indicating its increased load to other access points (e.g., access point B 320-B and access M 320-M). In response to detecting the client device's 310 disassociation, access point A 320-A broadcasts a load message indicating its decreased load to other access points (e.g., access point B 320-B and access point M 320-M).

In some implementations, the candidacy message and the load message are broadcasted to other access points over wired LAN. For example, in FIG. 3, a WLAN subnet 305 includes a plurality of nodes, such as N1 330-1, N2 330-2, N3 330-3, N4 330-4, N5 330-5, N6 330-6, N7 330-7, etc. These nodes 330 are connected through wired links with a plurality of nodes being edge nodes. The edge nodes, e.g., N1 330-1, N2 330-2, and N5 330-5, are connected to access points 320 through wired links, e.g., access point A 320-A is connected to the edge node N1 330-1 through wired link, access point B 320-B is connected to the edge node N5 330-5, and access point M 320-M is connected to the edge node N2 330-2. Further, the edge node N1 330-1 is connected to the edge node N5 330-5 and edge node N2 330-2 through wired links. Through the wired links, the control messages (including the candidacy messages and the load messages) from the access points 320 are exchanged within WLAN subnet 305 in accordance with some implementations.

With up-to-date candidacy and load information of access points in the network 305, each access point has information to decide whether it should accept a client device association request in the best interest of the network 305. For example, if access point A 320-A has the lowest load among candidate access points 320 for the client device 310, access point A 320-A can accept the client device 310 association request by sending an association response to the client device 310 with status code 0, meaning SUCCESS in certain IEEE 802.11 standards. On the other hand, if another candidate access point has a lower load, e.g., access point B 320-B, then access point A 320 can reject the association request, e.g., by sending an association response with status code 17 to the client device 310, meaning "Association denied because access point is unable to handle additional associated STAs" in certain IEEE 802.11 standards.

Figure 4:
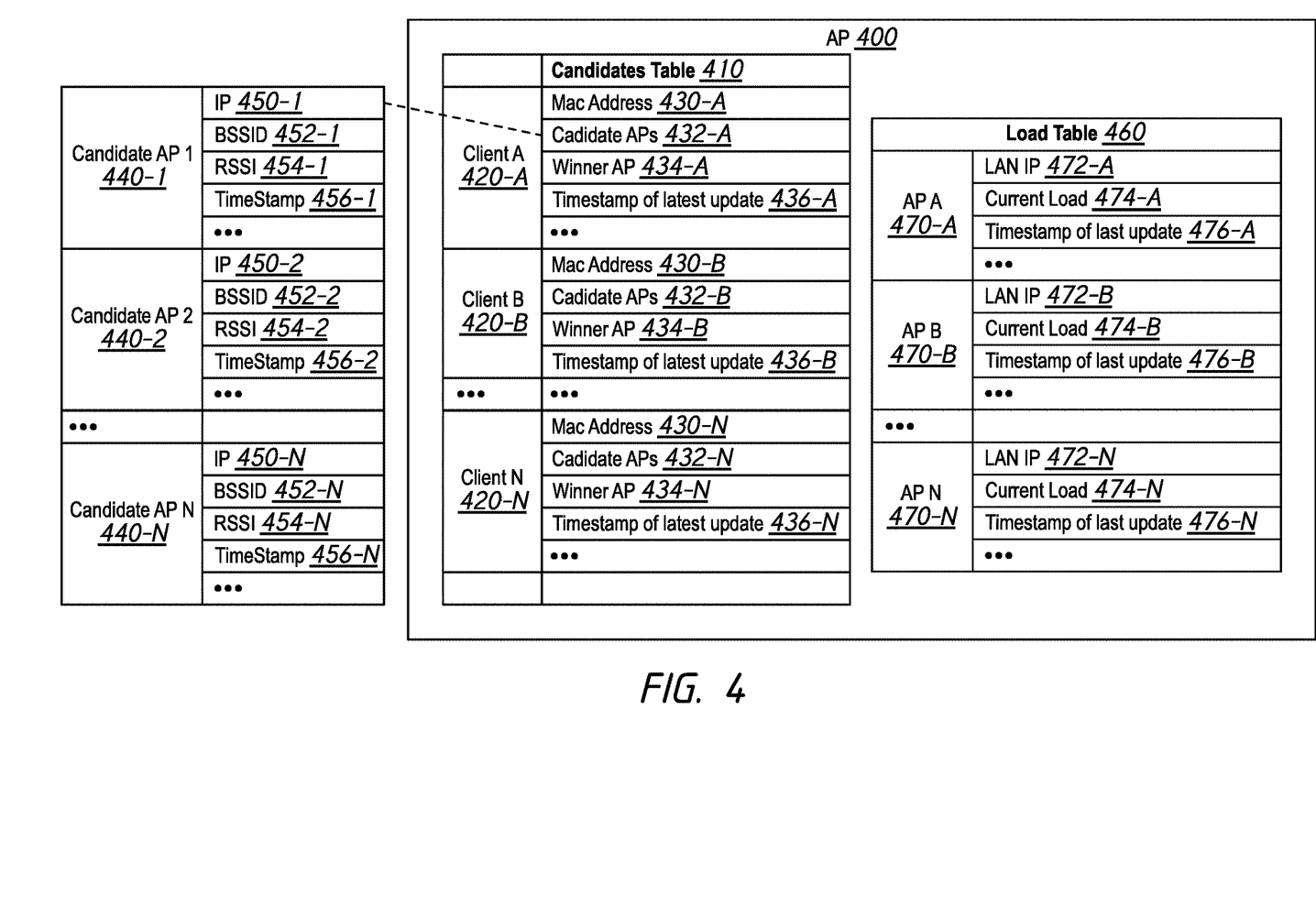
FIG. 4 is a schematic diagram of an access point with stored candidacy and load information in accordance with some implementations.

FIG. 4 is a schematic diagram of an access point with candidacy and load information in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein.

To that end, in some implementations, each access point 400 maintains a per-client candidates table 410 that keeps track of candidate access points for each client device 420. In some implementations, each entry of the candidates table 410 records a MAC address 430 of a respective client device (e.g., as a key used for lookup), a sub-table 432 of candidate access points for the client device, current preferred (or best or winner) access point 434 for the client device, a timestamp of the latest update 436, and others. For example, for client device A 420-A, the candidates table 410 includes an MAC address 430-A of client device A 420-A, a sub-table 432-A of candidate access points for client device A 420-A, a winner access point 434-A for client device A 420-A, and a timestamp of latest update 436-A of the entry for client A 420-A in the candidates table 410, and others.

In some implementations, each entry of the sub-table 432 records LAN IP address 450 of a respective candidate access point, the respective candidate access point's BSSID 452, RSSI 454 from the client device to the candidate access point, and a timestamp 456 of the latest update. For example, as shown in FIG. 4, a plurality of candidate access points, e.g., candidate access point 1 440-1, candidate access point 2 440-2 . . . candidate access point N 440-N, are associated with client device A 420-A. For candidate access point 1 440-1, the candidate access points sub-table 432-A includes its LAN IP address 450-1, BSSID 452-1, RSSI 454-1 from the client device 420-A to candidate access point 1 440-1, and a timestamp 456-1 of latest update of the entry for candidate access point 1 440-1 in the sub-table, among others. As shown corresponding to FIGS. 2 and 3, the information associated with the candidate access points 432 is obtained through candidacy and load information exchange among the access points connectable to the client devices 420, and upon obtaining the exchanged information, the candidacy information is stored in the candidates table 410, including the sub-table 432.

In some implementations, each access point 400 also maintains a load table 460 that keeps track of loads of a plurality of access points (e.g., access points within the same WLAN subnet 305, FIG. 3). Each entry of the load table 460 records LAN IP address of an access point, its current load, and timestamp of the latest update. For example, as shown in FIG. 4, the load table 460 includes load information of access point A 470-A, access point B 470-B . . . access point N 470-N. For access point A, the entry in the load table 460 includes its LAN IP 472-A, current load 474-A, and a timestamp of last update 476-A of the entry for access point A 470-A, and others.

With the candidates table 410 and the load table 460 stored locally on each access point 400, the locally stored information in these tables 410 and 460 can be used to achieve client device load balancing in a distributed and timely manner. For example, when an access point (A) receives a probe request from a client device (C), A checks the SSID in the probe request. If the SSID is not empty and does not match any SSID that A supports, A takes no action. Otherwise, A looks up its candidates table 410, updates one or more existing entries, or inserts a new entry for C accordingly. If necessary, A also updates the winner access point for C, such as updating a respective winner AP 434 if A itself has the lowest load among candidate access points. Furthermore, if the SSID matches one of the SSIDs that A supports, A constructs a candidacy message and broadcasts the message (e.g., as the control message in FIG. 3) to other access points over wired LAN. In some implementations, the candidacy message carries current load of A, MAC address of C, RSSI from C to A, and current timestamp. Upon receiving the candidacy message, the other access points update their local candidates table 410 and load table 460 accordingly, such as updating the current load 474 in the load table, the MAC address 430 in the candidates table 410, the timestamp 436 in the candidates table 410, and/or the timestamp 456 in the candidate access points sub-table 432.

Continuing the above example, when another access point (B) receives the candidacy message from A with the MAC address of C, B looks up its load table 460, updates existing entry or inserts a new entry for A accordingly with current load of A carried in the message, as well as updates winner access point in its candidates table 410 for clients for which A is a candidate access point. B also looks up its candidates table 410, updates existing entry, or inserts a new entry for C accordingly. If necessary, B updates winner access point 434 for C in the candidates table 410; for example, if B has the lowest load among candidate access points for C.

In another example, when A receives an association request from C, A looks up its local candidates table 410. If A itself is current winner access point for C, A accepts the request by sending an association response to C with status code 0. If A is not current winner access point for C, A rejects the request by sending an association response to C with status code 17. Some client devices may not take the hint and send a second association request to the same access point after the first request is rejected. To accommodate these client devices, in some implementations, an access point keeps track of such rejections and configures a policy of accepting the second association request after rejecting the first one. In addition to sending the association response, when C associates to or disassociates from A, A updates its load in the load table 460, constructs a load message (e.g., the control message, FIG. 3), and broadcasts the message to other access points over wired LAN in accordance with some implementations. When access point B receives the load message from A, B looks up its load table 460, updates existing entry or inserts a new entry for A accordingly with the current load of A carried in the message, as well as updates the winner access point 432 in the candidates table 410 for clients for which A is a candidate access point.

The client balancing in accordance with implementations described herein also applies to currently associated clients, as load distribution among access points becomes unbalanced over time. In some implementations, each access point periodically broadcasts load messages (e.g., as part of the control message, FIG. 3) in order to ensure other access points have up-to-date load information. Accordingly, when deciding a winner access point for a client, an access point considers a plurality of candidate access points from which the access point has received a load message recently. This is particularly helpful when an access point is down, and hence other access points have not received any messages from the down access point. In some implementations, each access point also periodically checks its candidates table 410 in order to determine whether the access point is no longer the winner access point for the currently associated client device; for example, another candidate access point of the client device has a lower load. In case the access point is no long the winner access point, in some implementations, the access point attempts to steer away the client device. In some implementations, the access point steers away the client device by sending a BSS Transition Management Request frame to the client device if the client device supports IEEE 802.11v. In some implementations, the access point sends a disassociation frame to the client device if the client device does not support IEEE 802.11v.

The aforementioned methods also apply to sticky client devices (also known as sticky clients), whose respective RSSIs with respect to their host access points have dropped below a threshold in order to support good quality of wireless connection, but have not proactively roamed to access points with better connection. In case of sticky client devices, the periodic broadcasting of loads, and examination of winner access points, facilitates the dynamic and seamless transitioning of the sticky client devices to other wireless links for better connection.

Figure 5A:
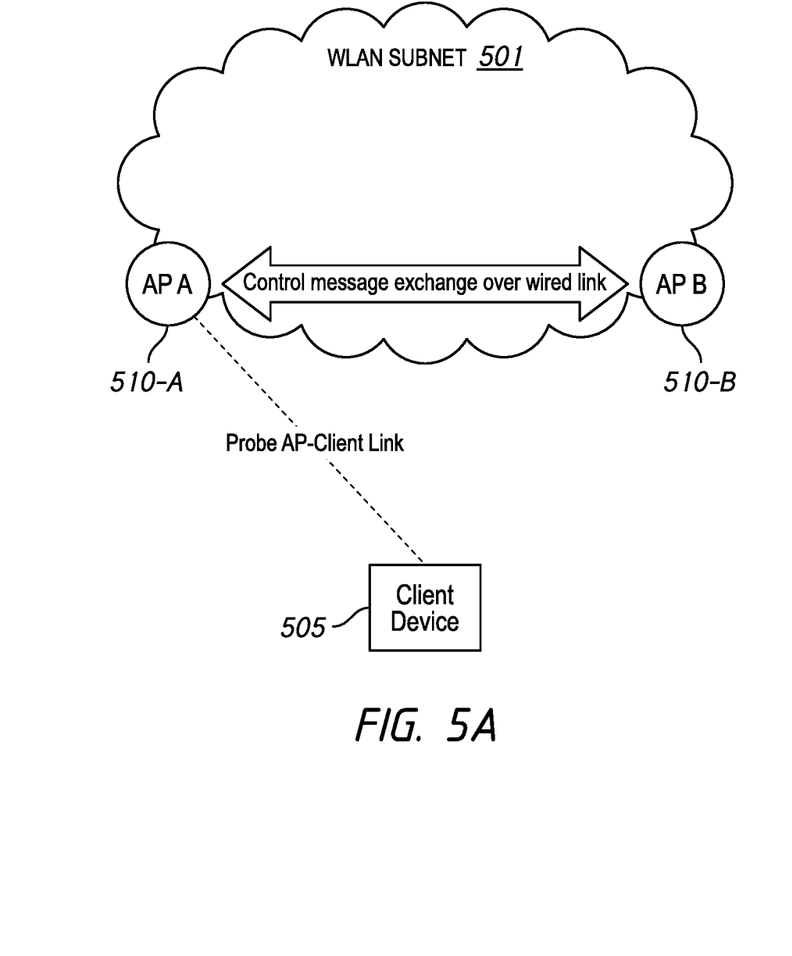
FIGS. 5A and 5B are schematic diagrams illustrating sticky client management in accordance with some implementations.
Figure 5B:
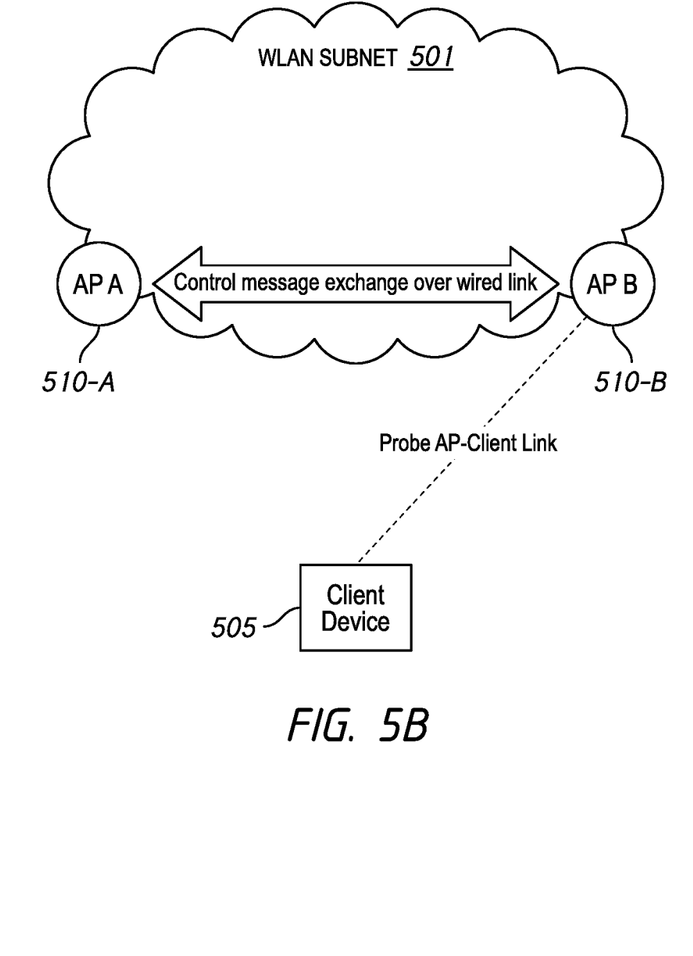

For example, in FIGS. 5A and 5B, both access point A 510-A and access point B 510-B are connected to a WLAN subnet 501. A client device 505 is initially connected to access point A 510-A, as illustrated in FIG. 5A. In some implementations, different access point-client links are probed and the best one under the current condition is chosen. The current condition can be impacted by factors, such as access point load, wireless interference, achievable capacity, etc. Because the access points are communicating with each other as described above with reference to FIGS. 2-4 without relying on information from the client devices, neighboring access points can seamlessly move the client devices between themselves and continuously measure metrics in order to determine the access point with the best client-connection criteria. Once the access points are probed, they exchange their connection scores, and unequivocally determine the winner access point with which the client device then associates. As described above with reference to FIG. 4, in some implementations, the probing process happens periodically in order to combat the dynamic wireless conditions. This ensures that the client is connected to the best access point. In FIG. 5B, the client device 505 is seamlessly switched to access point B 510-B, because based on the probing of the wireless link between access point A 510-A and the client device 505 and/or the current condition of the wireless subnet 501, access point B 510-B is collectively selected as the winner access point.

Access point-client link selection is critical for good network performance, and is a long-studied problem, but has no clear solution. Existing mechanisms are largely client dependent, letting the client choose the best access point according to its limited view of the network. While new standards like 802.11v allow access points to steer clients away, largely this process is dependent on the client behavior, since the client might want to stick with the current access point. Further, the possible disruption (e.g., due to re-association to another access point) deters clients from continuously changing access points. Implementations described herein use a probing-driven approach in order to select the best access point for a client. Since the probing is transparent to the client, the effectiveness of the best access point selection improves over conventional systems and methods. In accordance with some implementations described herein, the client device may not even be aware of the seamless switching of the physical access point. As such, traffic flows as usual, the client device does not suffer service disruption during the link selection and establishment process, thereby reducing the association overhead and eliminating or reducing service disruption.

Figure 6:
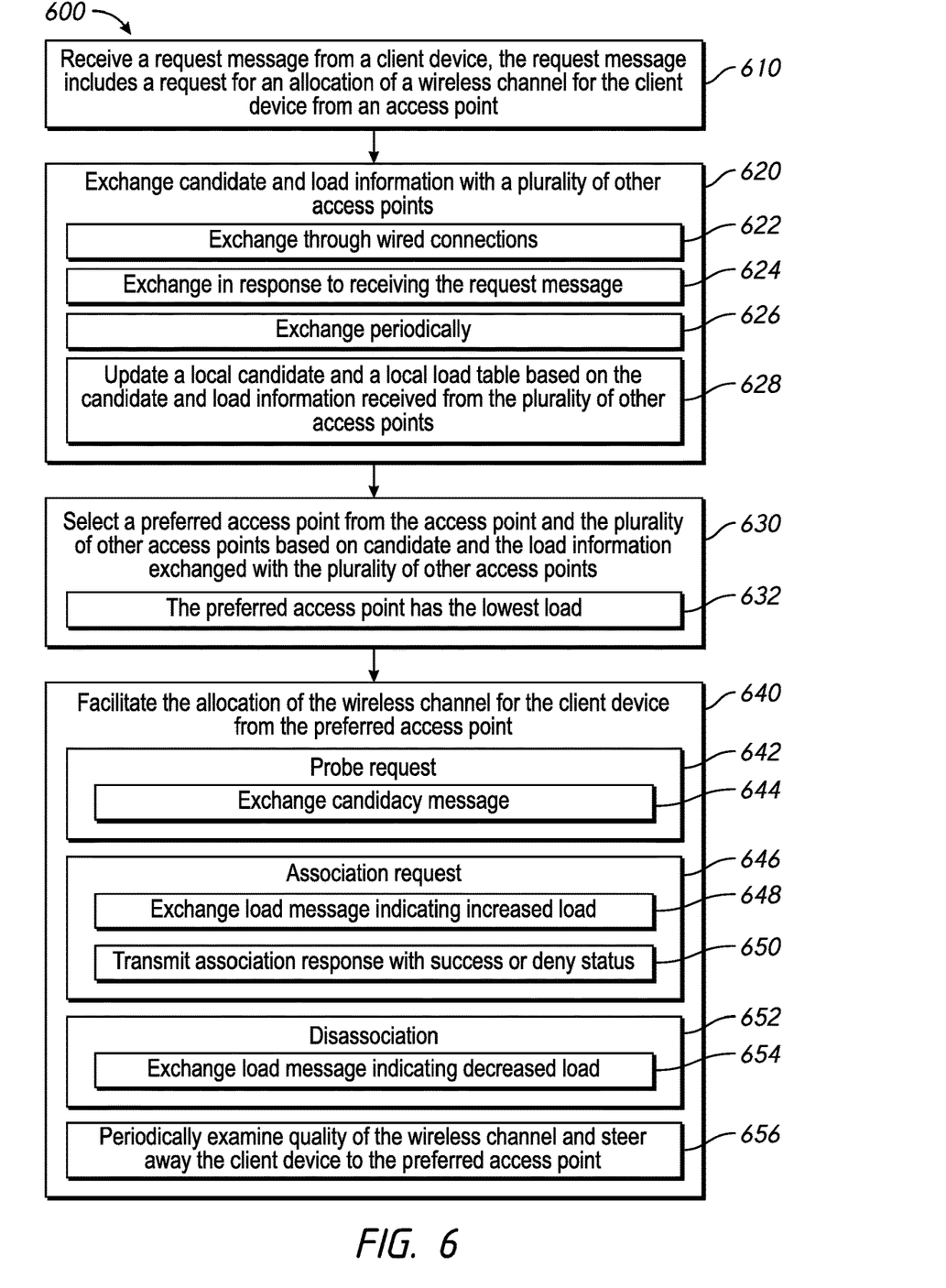
FIG. 6 is a flowchart representation of a method of dynamic and seamless link selection in accordance with some implementations.

FIG. 6 is a flowchart representation of a method 600 of dynamic and seamless link selection in accordance with some implementations. In some implementations and as detailed below as an example, the method 600 is performed at an access point, such as the wireless access point 130 (FIG. 1), 210 (FIG. 2), 320 (FIG. 3), 400 (FIG. 4), or 510 (FIG. 5). In some implementations, the method 600 is performed by processing logic, including hardware, firmware, software, or a combination thereof. In some implementations, the method 600 is performed by a processor, a controller, and/or a circuitry executing code stored in a non-transitory computer-readable medium (e.g., a memory). Briefly, the method 600 includes receiving a request message from a client device, where the request message includes a request for an allocation of a wireless channel for the client device from the access point, exchanging candidate and load information with a plurality of other access points, selecting a preferred access point from the access point and the plurality of other access points based on the candidate and load information exchanged with the plurality of other access points, and facilitating the allocation of the wireless channel for the client device from the preferred access point.

To that end, as represented by block 610, the method 600 includes receiving a request message from a client device. In some implementations, the request message includes a request for an allocation of a wireless channel for the client device from the access point. For example, as shown in FIGS. 2 and 5A-5B, the request message can be a probe request message from the client device 220. In another example, as shown in FIG. 3, the request message can be a probe request message, an association (or joining) request message.

The method 600 continues, as represented by block 620, with the access point exchanging candidate and load information with a plurality of other access points. For example, as shown in FIG. 3, candidate and load information is encapsulated in one or more control messages, and access point A 320-A exchanges the one or more control messages with access point B 320-B and access point M 320-M. Further, as represented by block 622, in some implementations, the candidate and load information encapsulated in the one or more control messages is exchanged through wired links between the access point and the plurality of other access points. In some implementations, these access points are on the same subnet, on the same floor, in the same building, or in the same LAN segment. For example, in FIG. 3, access point A 320-A, access point B 320-B, and access point M 320-M are part of the same WLAN subnet 305. Also as shown in FIG. 3, the control message exchanged between access point A 320-A and other access points, such as access point B 320-B and access M 320-M are through wired links. For example, control messages that are exchanged between access point A 320-A and access point B 320-B pass through the wired links connecting node N1 330-1 and node N5 330-5. In another example, the control messages that are exchanged between access point A 320-A and access point M 320-M pass through the wired links connecting node N1 330-1, node N5 330-5, node N7 330-7, and node N2 330-2.

In some implementations, as represented by block 624, the candidate and load information is exchanged in response to receiving the request message; for example, the candidate access points 210 exchange the candidate and load information in response to receiving the probe request from the client 220, as indicated by the dotted lines in FIG. 2. In some other implementations, as represented by block 626, the access point and the plurality of other access points periodically exchange the candidate and load information.

In some implementations, as represented by block 628, the method 600 includes updating a local candidates table and a local load table, stored in the non-transitory memory of the access point, based on the candidate and load information received from the plurality of other access points. For example, as shown in FIG. 4, the local candidates table 410 stored on the access point 400 includes candidate access points 432 for each client device 420, and the local load table 460 stored on the access point 400 keeps track of loads of access points 470. Further as shown in FIG. 4, in some implementations, an entry of the local candidates table includes a MAC address 430 (e.g., as a key for lookup or indexing) of a particular client device 420, a sub-table 432 of candidate access points for the particular client device, a current preferred access point 434 for the particular client 420, and a timestamp of latest update of the entry 436. Also as shown in FIG. 4, in some implementations, an entry of the local load table includes a LAN IP address 472 of a respective access point 470, a current load 474 of the respective access point 470, and a timestamp of latest update to the entry 476.

Referring back to FIG. 6, as represented by block 630, the method 600 includes selecting a preferred access point from the access point and the plurality of other access points based on the candidate and load information exchanged with the plurality of other access points. In some implementations, as represented by block 632, selecting the preferred access point from the access point and the plurality of other access points based on the candidate and load information exchanged with the plurality of other access points includes selecting the preferred access point with the lowest load among candidate access points based on the candidate and load information. In other words, the preferred access point has the lowest load among candidate access points for the client device. Other criteria for selecting the preferred access point can be used in place of or in conjunction with the lowest load criteria, such as latency, bandwidth, distance, user configured policy (e.g., accepting a second association request after rejecting a first association request from the same client), security etc.

Still referring to FIG. 6, as represented by block 640, the method 600 includes facilitating the allocation of the wireless channel for the client device from the preferred access point. In some implementations, the request can be a probe request or an association request.

For example, as represented by block 642, the request can be a probe request including SSID of the client device and RSSI of the wireless channel as shown in FIG. 2. In such embodiments, as represented by block 644, the candidate and load information exchanged with the plurality of other access points includes a candidacy message informing the plurality of other access points of its candidacy to host the client device. For example, as shown in FIG. 2, upon receiving the probe request from the client device, the access point broadcasts the candidacy message (e.g., over wired LAN in the same subnet) in order to inform other access points about its candidacy to host the client device. Accordingly, as explained above with reference to FIG. 4, the plurality of other access points updates respective local candidates tables 410 and/or local load tables 460.

In another example, as represented by block 646, the request for the allocation of the wireless channel includes an association request from the client device to establish the wireless channel. In such embodiments, as represented by block 648, the candidate and load information exchanged with the plurality of other access points includes a load message in order to update the plurality of other access points of an increase in load of the access point. Upon receiving the load message, the plurality of other access points update the load information in each respective local load table (e.g., the load table 460 in FIG. 4). Further, in such embodiments, as represented by block 650, facilitating the allocation of the wireless channel for the client device from the preferred access point includes, in response to receiving the association request, determining whether the access point is the preferred access point. For example, in FIG. 4, by examining the candidate access points sub-table 432 and cross referencing the load table 460, the current loads of candidate access points for the client device can be determined. An access point with the lowest load would be the preferred access point in accordance with some implementations. Having determined the preferred access point, the access point transmits an association response with success status (e.g., status code 0 in IEEE 802.11 standard) to the client device in case the access point is the preferred access point. Alternatively, the access point transmits an association response with deny status (e.g., status code 17 in IEEE 802.11 standard) to the client device in accordance with a determination that the access point is not the preferred access point.

In some implementations, as represented by block 652, the method 600 further comprises detecting a disassociation of the client device from the access point. In such implementations, as represented by block 654, the candidate and load information exchanged with the plurality of other access points includes a load message in order to update the plurality of other access points of a decrease in load of the access point. Upon receiving the load message, the plurality of other access points update the load information in each respective local load table (e.g., the load table 460 in FIG. 4), as explained above with reference to FIG. 4.

In some implementations, as represented by block 656, the method 600 includes periodically examining the quality of the wireless channel, so that in case the client device is a sticky client device, as shown in FIG. 5, whose RSSI to the access point has dropped below a predetermined threshold value, the preferred access point is selected from the plurality of other access points based on the candidate and load information stored on the access point. In such implementations, facilitating the allocation of the wireless channel for the client device from the preferred access point includes steering away the client device to the preferred access point for better quality of the wireless channel.

Figure 7:
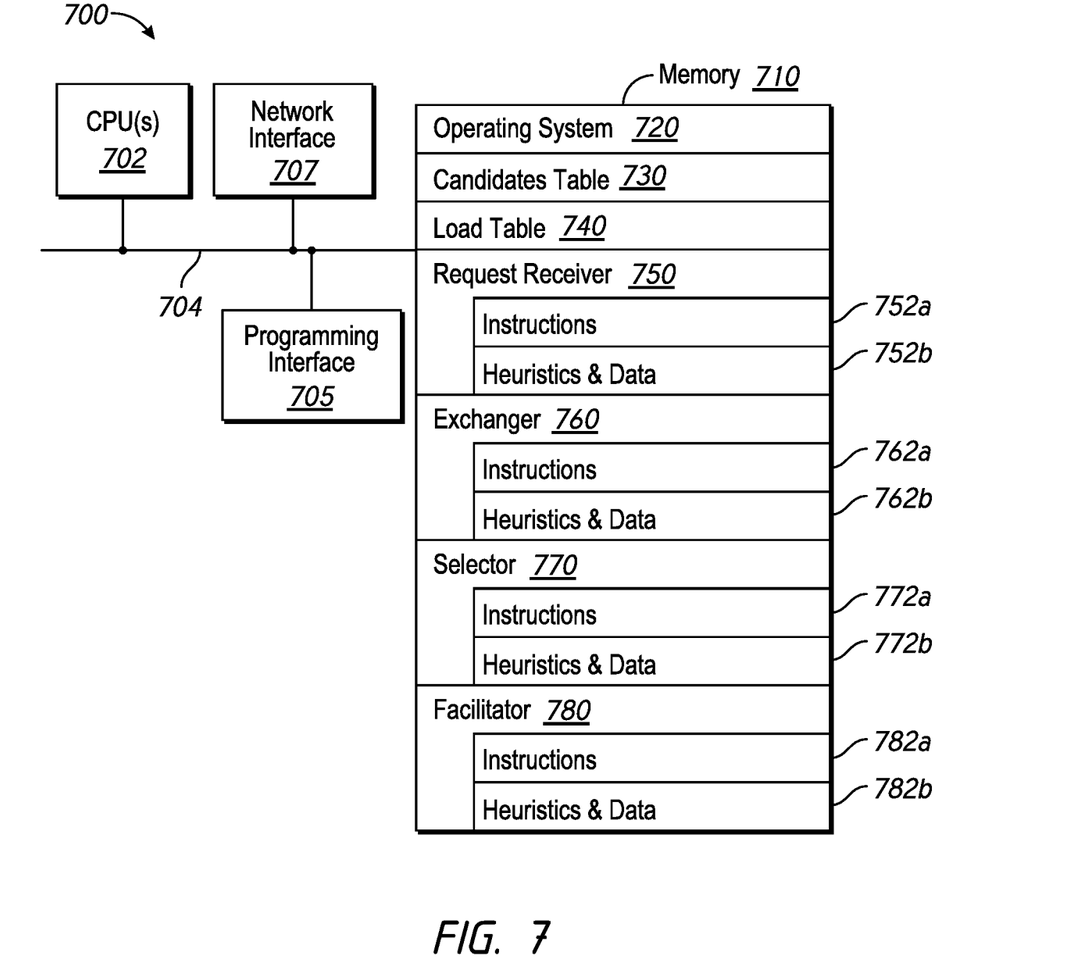
FIG. 7 is a block diagram of a computing device in accordance with some implementations.

FIG. 7 is a block diagram of a computing device 700 in accordance with some implementations. In some implementations, the computing device 700 corresponds to an access point, such as the wireless access point 130 (FIG. 1), 210 (FIG. 2), 320 (FIG. 3), 400 (FIG. 4), or 510 (FIG. 5), and performs one or more of the functionalities described above with respect to an access point. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations the computing device 700 includes one or more processing units (CPU's) 702 (e.g., processors), one or more network interfaces 707, a memory 710, a programming interface 705, and one or more communication buses 704 for interconnecting these and various other components. In some implementations, the one or more network interfaces 707 include at least one wireless network interface and at least one wired network interface. For example, through the at least one wireless network interface, the computing device 700 (e.g., an access point device) establishes wireless connection with one or more client devices as shown in FIG. 1; and through the at least one wired network interface, the computing device 700 connects to a WLAN subnet, as shown in FIG. 3.

In some implementations, the communication buses 704 include circuitry that interconnects and controls communications between system components. The memory 710 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 710 optionally includes one or more storage devices remotely located from the CPU(s) 702. The memory 710 comprises a non-transitory computer readable storage medium. Moreover, in some implementations, the memory 710 or the non-transitory computer readable storage medium of the memory 710 stores the following programs, modules and data structures, or a subset thereof including an optional operating system 720, a candidates table 730 (e.g., the candidates table 410 in FIG. 4), a load table 740 (e.g., the load table 460 in FIG. 4), a request receiver 750, an exchanger 760, a selector 770, and a facilitator 780. In some implementations, one or more instructions are included in a combination of logic and non-transitory memory. The operating system 720 includes procedures for handling various basic system services and for performing hardware dependent tasks.

In some implementations, the request receiver 750 is configured to receive a request message from a client device, including a request for an allocation of a wireless channel for the client device from the access point. To that end, the request receiver 750 includes a set of instructions 752a and heuristics and data 752b.

In some implementations, the exchanger 760 is configured to exchange candidate and load information with a plurality of other access points. To that end, the exchanger 760 includes a set of instructions 762a and heuristics and data 762b.

In some implementations, the selector 770 is configured to select a preferred access point from the access point and the plurality of other access points based on the candidate and load information exchanged with the plurality of other access points. To that end, the selector 770 includes a set of instructions 772a and heuristics and data 772b.

In some implementations, the facilitator 780 is configured to facilitate the allocation of the wireless channel for the client device from the preferred access point. To that end, the facilitator 780 includes a set of instructions 782a and heuristics and data 782b.

Although the candidates table 730, load table 740, request receiver 750, exchanger 760, selector 770, and facilitator 780 are illustrated as residing on a single computing device 700, it should be understood that in other embodiments, any combination of the candidates table 730, load table 740, request receiver 750, exchanger 760, selector 770, and facilitator 780 are illustrated as residing on a single computing device 700 can reside in separate computing devices in various implementations. For example, in some implementations, each of the candidates table 730, load table 740, request receiver 750, exchanger 760, selector 770, and facilitator 780 are illustrated as residing on a single computing device 700 resides on a separate computing device.

Moreover, FIG. 7 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above can be embodied in a wide variety of forms and that any specific structure and/or function described above is merely illustrative. Based on the present disclosure one skilled in the art should appreciate that an aspect described herein can be implemented independently of any other aspects and that two or more of these aspects can be combined in various ways. For example, an apparatus can be implemented and/or a method can be practiced using any number of the aspects set forth herein. In addition, such an apparatus can be implemented and/or such a method can be practiced using other structure and/or functionality in addition to or other than one or more of the aspects set forth herein.

It will also be understood that, although the terms "first," "second," etc. can be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

What is claimed is:

1. A method comprising:
    at an access point including a processor and non-transitory memory:
        receiving a request message from a client device, the request message including a request for an allocation of a wireless channel for the client device from the access point;
        upon receipt of the request message, generating a control message including candidate and load information;
        causing a plurality of other access points to respond with other candidate and load information by sending the control message;
        receiving the other candidate and load information from the plurality of other access points;
        selecting a preferred access point, from among the access point and the plurality of other access points, based on the candidate and load information and the other candidate and load information; and
        facilitating the allocation of the wireless channel for the client device from the preferred access point.

2. The method of claim 1, wherein the control message is sent and the other candidate and load information are sent between the access point and the plurality of other access points through wired connections.

3. The method of claim 1, wherein the exchanging of the candidate and load information with the plurality of other access points is performed periodically.

4. The method of claim 1, further comprising:
    updating a local candidates table and a local load table stored in the non-transitory memory based on the other candidate and load information.

5. The method of claim 4, wherein the local candidates table includes candidate access points for each client device connectable to the access point and the plurality of other access points.

6. The method of claim 4, wherein an entry of the local candidates table includes a MAC address of a particular client device, a sub-table of candidate access points for the particular client device, a current preferred access point for the particular client device, and a timestamp of latest update of the entry.

7. The method of claim 4, wherein the local load table includes loads of the access point and the plurality of other access points.

8. The method of claim 4, wherein an entry of the local load table includes a LAN IP address of a respective one of the access point and the plurality of other access points, a current load of the respective one of the access point and the plurality of other access points, and a timestamp of latest update to the entry.

9. The method of claim 1, wherein the selecting of the preferred access point includes selecting the preferred access point with the lowest load among candidate access points based on the candidate and load information.

10. The method of claim 1, wherein the request is a probe request including SSID of the client device and RSSI of the wireless channel.

11. The method of claim 10, wherein the candidate and load information includes a candidacy message informing the plurality of other access points of its candidacy to host the client device.

12. The method of claim 1, wherein the request for the allocation of the wireless channel includes an association request from the client device to establish the wireless channel, the association request including one of a plurality of status codes.

13. The method of claim 12, wherein the candidate and load information includes a load message to update the plurality of other access points of an increase in load of the access point.

14. The method of claim 12, wherein the facilitating of the allocation of the wireless channel for the client device from the preferred access point includes:
    determining whether the access point is the preferred access point in response to receiving the association request;
    transmitting an association response with a success status to the client device in accordance with a first determination that the access point is the preferred access point; and
    transmitting an association response with a deny status to the client device in accordance with a second determination that the access point is not the preferred access point.

15. The method of claim 1, further comprising:
detecting a disassociation of the client device from the access point.

16. The method of claim 15, wherein the candidate and load information includes a load message to update the plurality of other access points of a decrease in load of the access point.

17. The method of claim 1,
wherein,
the selecting of the preferred access point includes:
periodically examining whether or not quality of the wireless channel has fallen below a predetermined threshold; and
selecting the preferred access point from the plurality of other access points in accordance with a determination that the quality of the wireless channel has fallen below the predetermined threshold; and
the facilitating of the allocation of the wireless channel for the client device from the preferred access point includes steering away the client device to the preferred access point.

18. The method of claim 1, further comprising:
determining the access point has a lower load than the plurality of other access points based on the candidate and load information and the other candidate and load information;
selecting the access point as the preferred access point; and
in response to the selecting of the access point, transmitting a success message to the client device and broadcasting a load message to the plurality of other access points, the success message with an indication the access point is the preferred access point, the load message indicating an increase in work load of the access point, the indication including one of a plurality of status codes.

19. A networking device comprising:
a wireless interface configured to receive a request message from a client device, the request message including a request for an allocation of a wireless channel for the client device from an access point;
a wired interface configured to send candidate and load information to a plurality of other access points;
a processor;
a non-transitory memory coupled to the processor; and
one or more programs stored in the non-transitory memory, which, when executed by the processor, cause the networking device to:
generate a control message upon receipt of the request message, the control message including candidate and load information;
cause the plurality of other access points to respond with other candidate and load information by sending the control message;
receive the other candidate and load information from the plurality of other access points;
select a preferred access point from among the access point and the plurality of other access points based on the candidate and load information and the other candidate and load information; and
facilitate the allocation of the wireless channel for the client device from the preferred access point.

20. A non-transitory computer-readable medium encoding instructions that, when executed by a processor of a networking device, cause the networking device to:
receive a request message from a client device, the request message including a request for an allocation of a wireless channel for the client device from an access point;
upon receipt of the request message, generate a control message including candidate and load information;
cause a plurality of other access points to respond with other candidate and load information by sending the control message;
receive the other candidate and load information from the plurality of other access points;
select a preferred access point from the access point and the plurality of other access points based on the candidate and load information and the other candidate and load information; and
facilitate the allocation of the wireless channel for the client device from the preferred access point.

* * * * *